(12) United States Patent
Wade et al.

(10) Patent No.: US 10,788,670 B2
(45) Date of Patent: Sep. 29, 2020

(54) METHOD TO MANUFACTURE LENS HAVING EMBEDDED HOLOGRAPHIC OPTICAL ELEMENT FOR NEAR EYE DISPLAY

(71) Applicant: INTEL CORPORATION, Santa Clara, CA (US)

(72) Inventors: Andrew G. Wade, San Clemente, CA (US); Mickael Guillaumee, Neucha Tel (CH); David Ziegler, Lausanne (CH); Volker Zagolla, Santa Clara, CA (US)

(73) Assignee: INTEL CORPORATION, Santa Clara, CA (US)

( * ) Notice: Subject to any disclaimer, the term of this patent is extended or adjusted under 35 U.S.C. 154(b) by 544 days.

(21) Appl. No.: 15/201,054

(22) Filed: Jul. 1, 2016

(65) Prior Publication Data

US 2018/0003974 A1    Jan. 4, 2018

(51) Int. Cl.
*B29C 45/14* (2006.01)
*B29D 11/00* (2006.01)
(Continued)

(52) U.S. Cl.
CPC ...... *G02B 27/0172* (2013.01); *B29D 11/0073* (2013.01); *B29D 11/00317* (2013.01);
(Continued)

(58) Field of Classification Search
CPC .......... B29C 45/14; B29C 2945/76153; B29D 11/00317; B29D 11/00326; B29D 11/00336; B29D 11/00346; B29D 11/00413; B29D 11/00461; B29D 11/0049; B29D 11/00567; B29D 11/0073; B29D 11/00769; B29L 2011/0016; B29L 2031/7224; B32B 2307/416; B32B 2307/418; B32B 2307/41; B32B 2551/00; G02B 5/32; G02B 27/0172; G02B 2027/0174; G03H 1/0236; G03H 1/0248; G03H 1/0252; G03H 1/0256; G03H 1/0272; G03H 1/0402; G03H 2001/0439; G03H 2001/221; G03H 2223/17; G03H 2223/23;
(Continued)

(56) References Cited

U.S. PATENT DOCUMENTS 5,712,355 A * 1/1998 Jones ................... C08F 214/186
526/254
2001/0028435 A1 10/2001 Evans et al.
(Continued)

FOREIGN PATENT DOCUMENTS

KR   1020040006609 A    1/2004
WO   WO-2014155288 A2 * 10/2014   ......... G02B 27/0172

OTHER PUBLICATIONS

International Search Report and Written Opinion received for PCT Patent Application No. PCT/US2017/035650, dated Aug. 21, 2017, 16 pages.

*Primary Examiner* — Ryan S Dunning

(57) ABSTRACT

Disclosed herein is a lens for a wearable projection system. The lens includes a holographic optical element embedded within the lens and covering a portion of the viewable area of the lens. The lens can be manufactured by filling a cavity in a lens blank with a photosensitive material and exposing the photosensitive material to a number of light beams to form the HOE.

8 Claims, 12 Drawing Sheets

(51) Int. Cl.
*G02B 5/32* (2006.01)
*G02B 27/01* (2006.01)
*G03H 1/02* (2006.01)
*G03H 1/04* (2006.01)
*B29L 11/00* (2006.01)

(52) U.S. Cl.
CPC ............ *G02B 5/32* (2013.01); *G03H 1/0236* (2013.01); *G03H 1/0256* (2013.01); *G03H 1/0402* (2013.01); *B29C 45/14* (2013.01); *B29C 2791/001* (2013.01); *B29K 2995/0018* (2013.01); *B29L 2011/00* (2013.01); *B29L 2011/0016* (2013.01); *G02B 2027/0174* (2013.01); *G02B 2027/0178* (2013.01); *G03H 1/0272* (2013.01); *G03H 2001/0434* (2013.01); *G03H 2001/0439* (2013.01); *G03H 2250/37* (2013.01)

(58) Field of Classification Search
CPC ........... G03H 2260/12; G03H 2260/14; G03H 2260/54; G03H 2270/14; G03H 2270/21; G03H 2270/54; G03H 2270/55; G02C 7/022; G02C 7/024; G02C 7/025; G02C 7/027; G02C 7/028; G02C 13/001; G02C 2202/08; G02C 2202/16; G02C 2202/20
USPC ....... 264/1.31, 1.32, 1.33; 359/3, 13, 14, 15, 359/19, 20, 35, 629, 630, 631; 425/808; 428/64.4; 351/159, 159.7, 159.73, 351/159.74, 159.75, 159.76, 159.77, 177, 351/178
See application file for complete search history.

(56) References Cited

U.S. PATENT DOCUMENTS

| | | | |
|---|---|---|---|
| 2002/0093701 A1* | 7/2002 | Zhang | G02B 5/32 359/15 |
| 2004/0145994 A1* | 7/2004 | Tsukagoshi | G03H 1/12 369/103 |
| 2005/0287243 A1* | 12/2005 | Sekihara | B29C 33/3828 425/567 |
| 2006/0192306 A1 | 8/2006 | Giller et al. | |
| 2008/0273246 A1 | 11/2008 | Moliton et al. | |
| 2009/0127726 A1* | 5/2009 | Spalding | B29C 33/48 264/1.7 |
| 2012/0199994 A1* | 8/2012 | Richert | B29C 39/148 264/1.35 |
| 2013/0009853 A1 | 1/2013 | Hesselink et al. | |
| 2013/0208238 A1* | 8/2013 | Blum | B29D 11/0073 351/159.39 |
| 2015/0378307 A1* | 12/2015 | Zheng | G03H 1/2286 359/3 |
| 2016/0033771 A1* | 2/2016 | Tremblay | G02B 26/10 345/8 |
| 2017/0068095 A1* | 3/2017 | Holland | B29D 11/00317 |

* cited by examiner

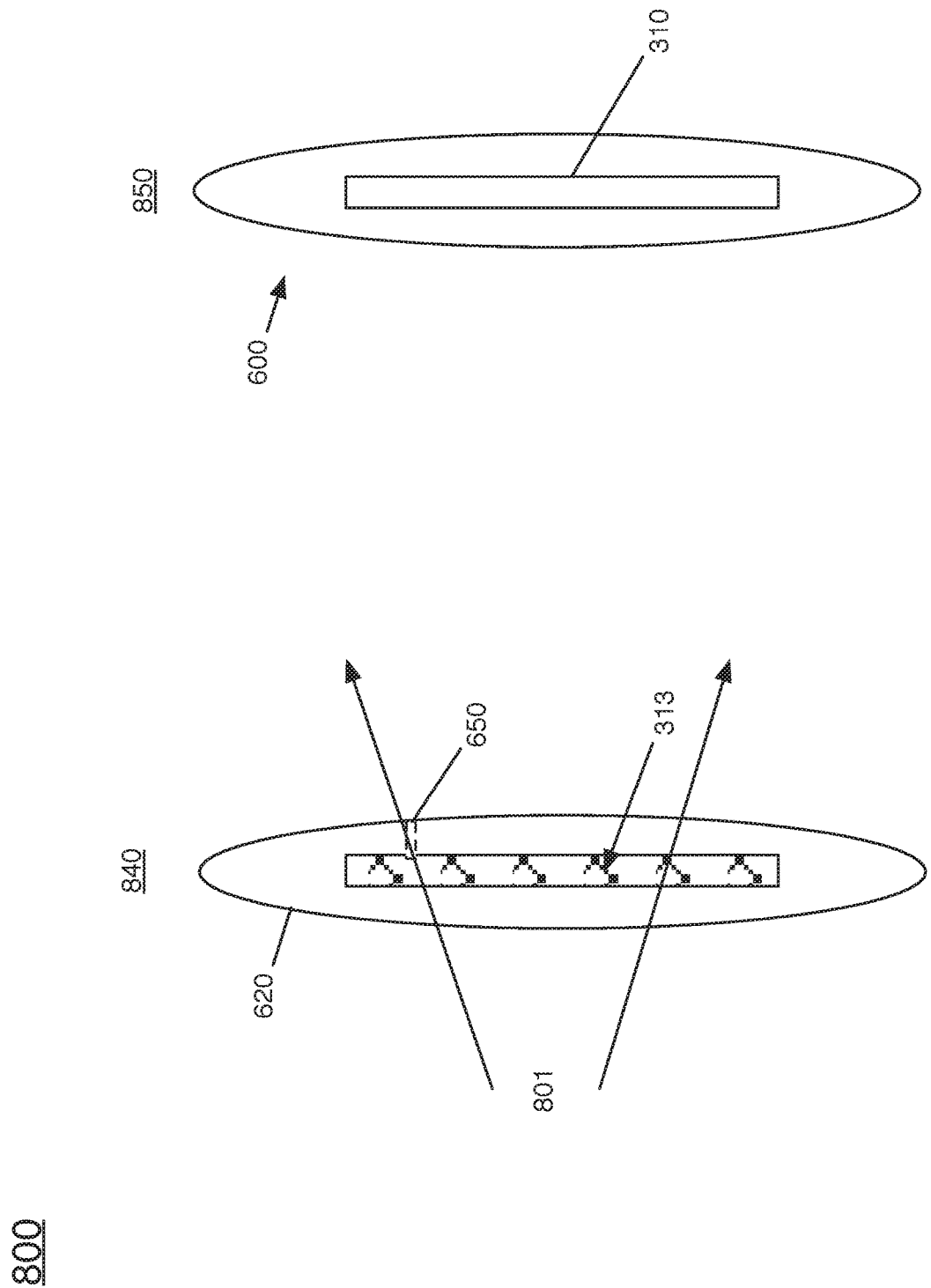

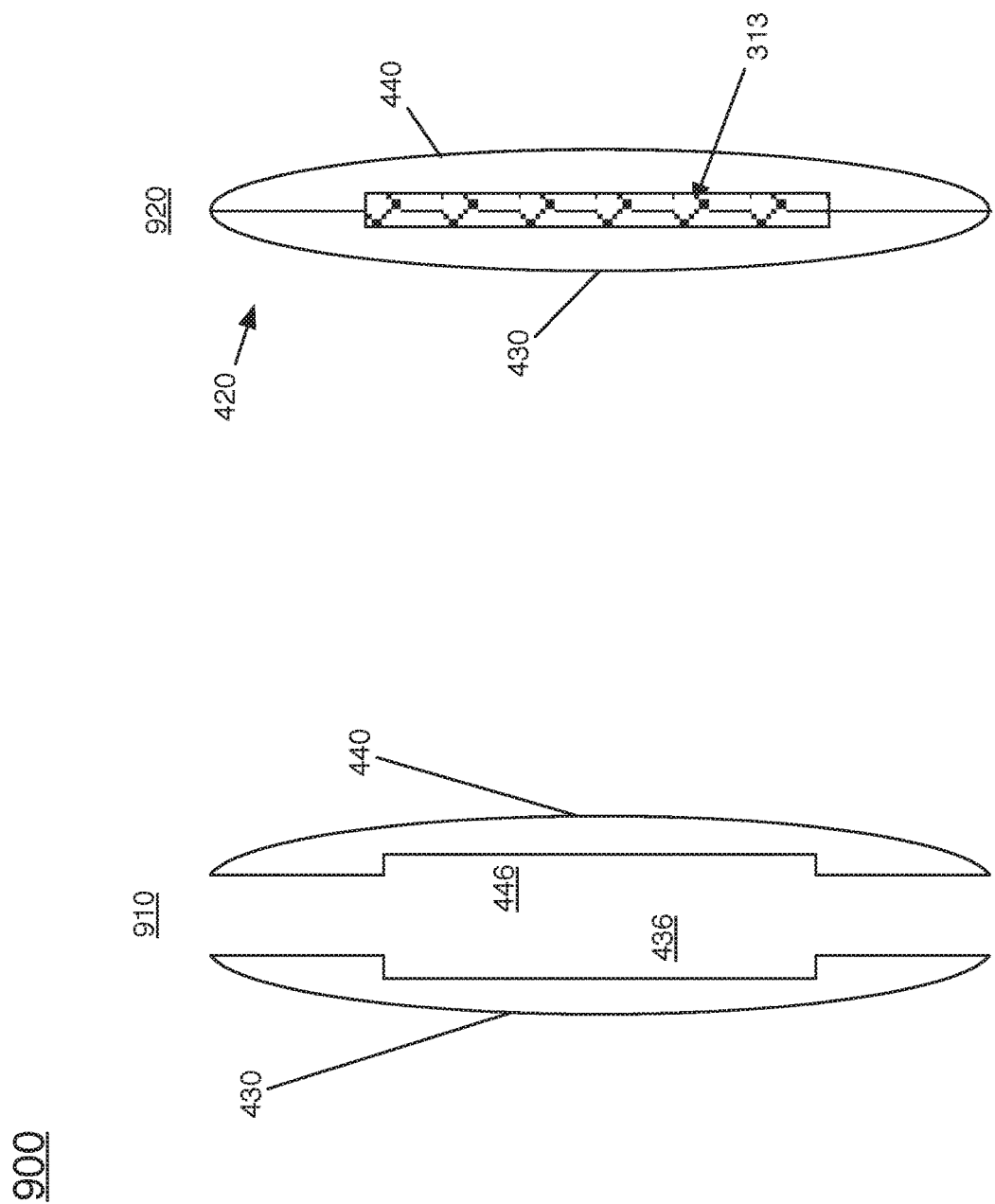

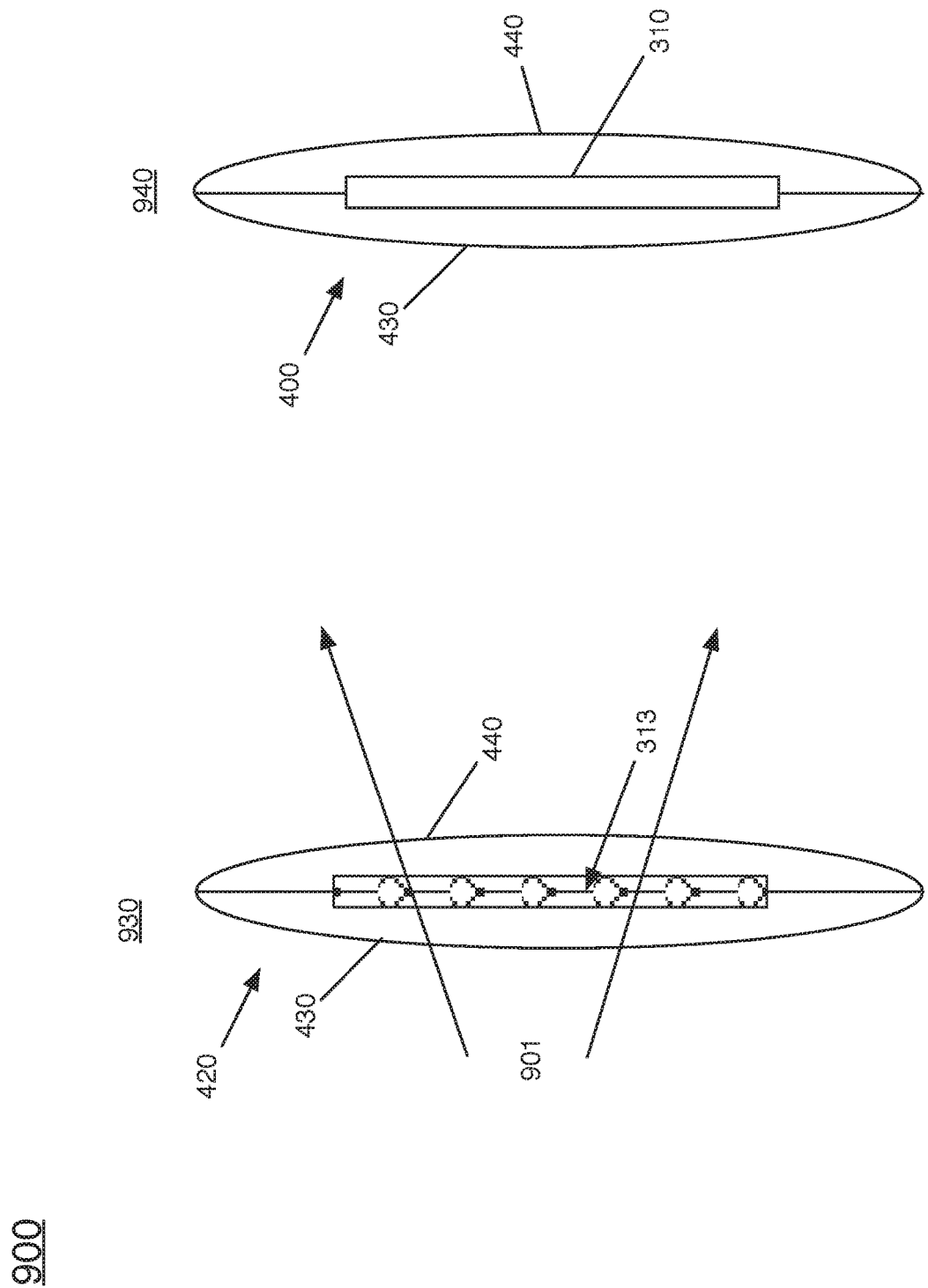

METHOD TO MANUFACTURE LENS HAVING EMBEDDED HOLOGRAPHIC OPTICAL ELEMENT FOR NEAR EYE DISPLAY

TECHNICAL FIELD

Embodiments herein generally relate to head worn displays and heads up displays; and in particular to lenses for such displays.

BACKGROUND

Modern display technology may be implemented to provide head worn displays (HWD) and to see through the display and to see information (e.g., images, text, or the like) in conjunction with the see through display. Such displays can be implemented in a variety of contexts, for example, defense, transportation, industrial, entertainment, wearable devices, or the like.

In particular, an image may be reflected off a transparent projection surface to a user's eye to present an image in conjunction with a real world view. Conventionally, HWD systems have extremely difficult tradeoffs between various design and utility considerations, such as, for example, bulk, form-factor, see-through quality, field of view, etc. For example, achieving a normal eyewear form factor without bulk has not been achieved in a commercial head mounted display.

BRIEF DESCRIPTION OF THE DRAWINGS

FIGS. 8A-8E illustrate a first example technique.
FIGS. 9A-9D illustrate a first example technique.

DETAILED DESCRIPTION

Figure 1:
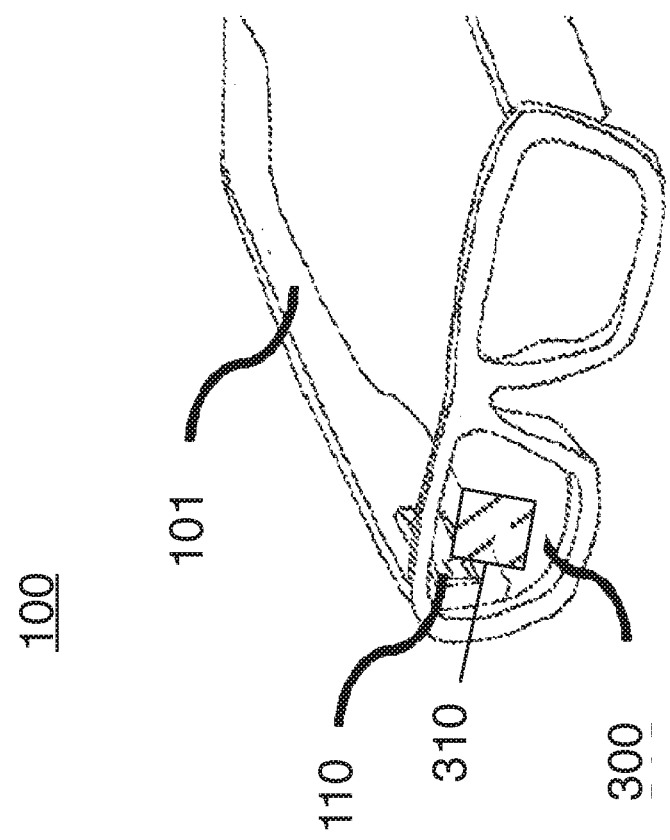
FIG. 1 illustrates an example first system.

Various embodiments may be generally directed to head worn displays (HWDs) and specifically to cast lenses for a head worn display. In some examples, HWDs can be implemented to provide a projection system along with a lens that includes a holographic optical element (HOE). The projection system and the lens can be mounted to a frame to be worn by a user, for example, glasses, a helmet, or the like. During operation, the projection system projects an image onto an inside (e.g., proximate to the user) surface of the lens. The HOE reflects the image to an exit pupil (or viewpoint). Ideally, the exit pupil is proximate to one of the user's eyes, and specifically, to the pupil of the user's eye. As such, the user may perceive the reflected image.

Conventionally, the HOE is laminated onto an exterior surface of the lens. In particular, the HOE is laminated over an entire surface of the backside of the lens. The present disclosure provides to embed the HOE within the lens. In particular, the present disclosure provides to fill a cavity in a lens blank with a photosensitive material. The photosensitive material is exposed to one or more light beams to form an HOE from the photosensitive material. The lens blank can then be shaped to a final lens shape while the HOE remains embedded within the lens itself.

In some examples, the lens blank can be formed around a removable material (e.g., wax, or the like). Subsequently, the wax can be removed to form a cavity within the lens blank. The cavity can be filled (e.g., cast, injected, or the like) with photosensitive material.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, known structures and devices are shown in block diagram form in order to facilitate a description thereof. The intention is to provide a thorough description such that all modifications, equivalents, and alternatives within the scope of the claims are sufficiently described.

Additionally, reference may be made to variables, such as, "a", "b", "c", which are used to denote components where more than one component may be implemented. It is important to note, that there need not necessarily be multiple components and further, where multiple components are implemented, they need not be identical. Instead, use of variables to reference components in the figures is done for convenience and clarity of presentation.

FIG. 1 illustrates an example of device 100 arranged according to the present disclosure. It is noted, that the device of this figure is depicted implemented as a pair of glasses. However, with some examples, the device 100 may be embodied as a pair of glasses (e.g., as depicted), as a pair of binoculars, a monocular device (e.g., scope, or the like), as goggles, as a helmet, as a visor, as a wearable device, or the like. Embodiments are not limited in this context.

In general, the device 100 is configured to provide a virtual display. In some examples, the device 100 may provide a virtual display in conjunction with a real world view. The device 100 includes a glasses frame 101 and a projection system 110 mounted to the frame 101. Additionally, the device 100 includes a projection surface 300, which may be a lens, such as, for example, a glasses lens as depicted. For convenience and clarity in discussing the present disclosure, the projection surface 300 is referenced as lens 300. However, embodiments are not limited in this context.

The lens 300 can be removably mounted in the frame 101. The lens 300 includes an HOE 310 (also referred to as a holographic optical combiner). The HOE 310 may be in a particular location and/or have particular optical characteristics to selectively reflect light incident on the lens 300 to an exit pupil (e.g., the exit pupil 237 shown in FIG. 2).

During operation, the projection system 110 projects light onto the lens 300. The projected light can correspond to virtual images. The lens 300, and specifically the HOE 310, reflects (or redirects) the light towards a user's eye. More particularly the HOE 310 reflects the projected light (e.g., the projected image, or the like) to an exit pupil. This is described in greater detail with respect to FIG. 2. With some examples, the lens 300 and the HOE 310 redirect the projected images and also transmit light from the external environment to the user's eye. As such, a virtual image and a real world image may be presented to the user. It is noted, that although the device 100 is depicted with a single projection system 110 and lens 300, the device 100 may include a projection system 110 and lens 300 including an HOE 310 for each eye. Examples are not limited in this context.

With some examples, the projection system 110 may comprise a light source, battery, and projector to project images onto the HOE 310. For example, the projection system 110 may comprise a scanning mirror to reflect and redirect light from the light source onto the HOE 310. In some examples, the scanning mirror may be a microelectromechanical system (MEMS) based scanning mirror. In some examples, the projection system 110 may comprise a panel micro display (e.g., light emitting diode (LED) panel, liquid crystal display (LCD) panel, or the like). Additionally, the projection system 110 may include control and graphics processing components configured to cause the system 110 to emit light from the light source and to scan and/or project the emitted light onto the lens 300 to project an image onto the HOE 310.

The lens 300 is described in greater detail below, for example, with respect to FIG. 2 and FIG. 3. However, a general description of the lens 300 is given here. With some examples, the lens 300 is an at least partially transparent surface with the HOE 310 embedded within the lens 300. More specifically, the lens 300 includes the HOE 310 embedded within the lens 300 and covering only a portion (e.g., less than all of) the surface area of the lens 300. During operation, the lens 300 and the HOE 310 may transmit light incident on a real world side of the lens 300 to provide a real world view. In some examples, the lens 300 is opaque and the lens 300 does not transmit light incident on a real world side of the lens 300. The HOE 310 may be disposed in a particular location of the lens 300 and/or may have particular optical characteristics to reflect an image projected onto an internal surface of the lens 300 to an exit pupil in a particular location. With some examples, the lens 300 may be sunglass lenses to reduce an amount or type of light transmitted through the lenses, for example, by polarization or absorption. With some examples, the lenses 300 may be prescription lenses to correct or augment light perceived from the real world and/or the virtual image.

Figure 2:
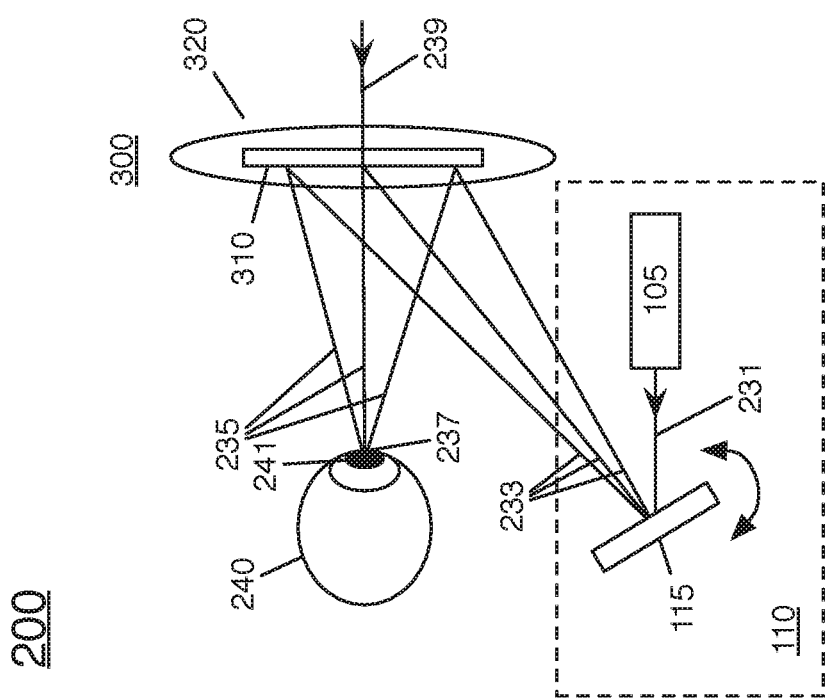
FIG. 2 illustrates an example second system.

For example, FIG. 2 is a block diagram illustrating a side view of a system 200 including an example implementation of the device 100. In general, the exemplary implementation of the device 100 depicted in this figure is configured to project light to an exit pupil 237 (e.g., proximate to, or directed at, a user's eye, or the like). That is, the device 100 is configured to reflect the image projected onto an HOE 310 to a virtual aperture (e.g., the exit pupil 237) in the optical system. The system 200 includes the projection system 110 including a light source 105 to emit a light beam 231 of at least one wavelength. Alternatively, the system 110 may receive light emitted from a source not included in the system. Examples are not limited in this context. The light beam 231 is incident on (or received by) a scanning mirror 115. The scanning mirror 115 rotates about a number of axes to scan the light beam 231 in angles 233.

The scanning mirror 115 scans the light beam 231 in angles 233 onto (or across) the lens 300 while the system 110 modulates or modifies the intensity of the scanned light beam 231 to correspond to a digital image. In particular, the scanning mirror 115 scans the light beam 231 over an area of lens 300 while the system 110 projects a digital image onto a portion of the area that includes the HOE 310.

The lens 300 comprises a lens blank 320. As depicted, the HOE 310 is embedded within the lens blank 320. In general, the lens blank 320 is formed with a cavity (e.g., refer to FIGS. 4-6) into which photosensitive material is filled. The photosensitive material is then exposed to form the HOE 310. It is noted, that a variety of techniques can be implemented to form HOEs from photosensitive material. In particular, the photosensitive material can be exposed to form a combiner lens (e.g., a holographic optical combiner lens, or the like) that reflects light (e.g., off-angle light, or the like) incident on a first surface while transmitting light incident on a second, opposite surface. Examples are not limited in this context.

Accordingly, during use, the lens 300 reflects the light 233 as diffracted light 235 to an exit pupil 237. Thus, the lens 300 reflects and diffracts the light 233 to the entrance pupil 241 of a user's eye 240. Furthermore, the lens 300, and particularly the HOE 310, transmits light 239, which is incident on a front side of the lens 300 and HOE 310. As depicted, the line of sight 243 of the eye (e.g., corresponding to the eye pupil 241) is aligned with the exit pupil 237 and with the light 239. As such, the user may perceive a virtual image (e.g., as projected to exit pupil 237) in conjunction with a real world view (e.g., corresponding to light 239).

It is noted, that although only a single input pupil (e.g., light beam 231) and a single exit pupil (e.g., the exit pupil 237) are depicted, embodiments may be implemented to receive multiple input pupils and project an image with multiple exit pupils (e.g., based on a single input pupil or from multiple input pupils). Examples are not limited in this context.

Figure 3:
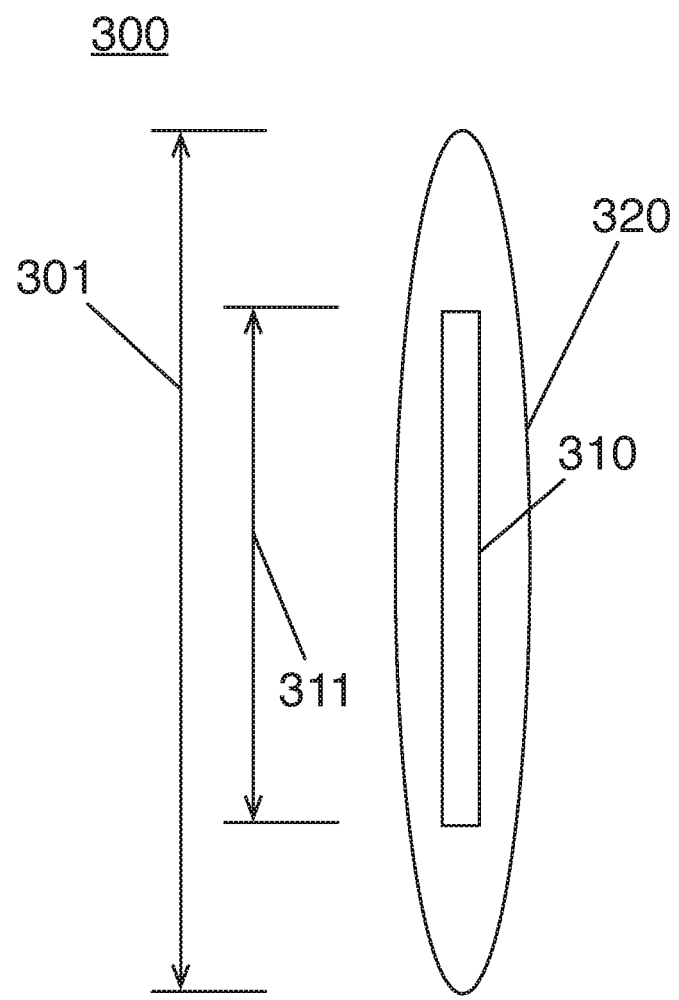
FIG. 3 illustrates an example lens for a projection system.

FIG. 3 illustrates a cut-away side view of the lens 300, arranged according to at least one example of the present disclosure. As depicted, the lens 300 includes a partial lens blank 320. Embedded within the partial lens blank 320 is the HOE 310. Various techniques for manufacturing the lens 300, and particularly, embedding the HOE 310 within the lens blank 320 are described below, for example, with respect to FIG. 7. It is important to note, that the HOE 310 is disposed over only a portion of the surface area 301 of the lens 300. For example, as depicted in this figure, the HOE 310 covers area 311 of the lens 300, while the lens 300 has total viewable area 301. It is noted, that the area 311 is given for example only, and not to be limiting. Furthermore, areas 301 and 311 are only depicted by the dimension shown in this figure and not two dimensions, as the figure is a cut-away view as opposed to a perspective view (e.g., as shown in FIG. 1). In practice, the HOE 310 may cover any amount of the lens area, less than the total area 301. For example, the HOE 310 may cover area 311, where area 311 is between 4 and 12 times smaller than the area 301.

Furthermore, it is noted, that the HOE 310 may be positioned in a specific location within lens 300. Said differently, the HOE 310 may be aligned to a specific location in the viewable area 301 of the lens 300. This is described in greater detail below, however, for purposes of clarity, the HOE 310 may be embedded within the lens blank 320 to have a specific arrangement or alignment in the viewable area 301 of the lens 300. Accordingly, during use, the HOE 310 may reflect and/or diffract light as described above with respect to FIG. 2.

Figure 4:
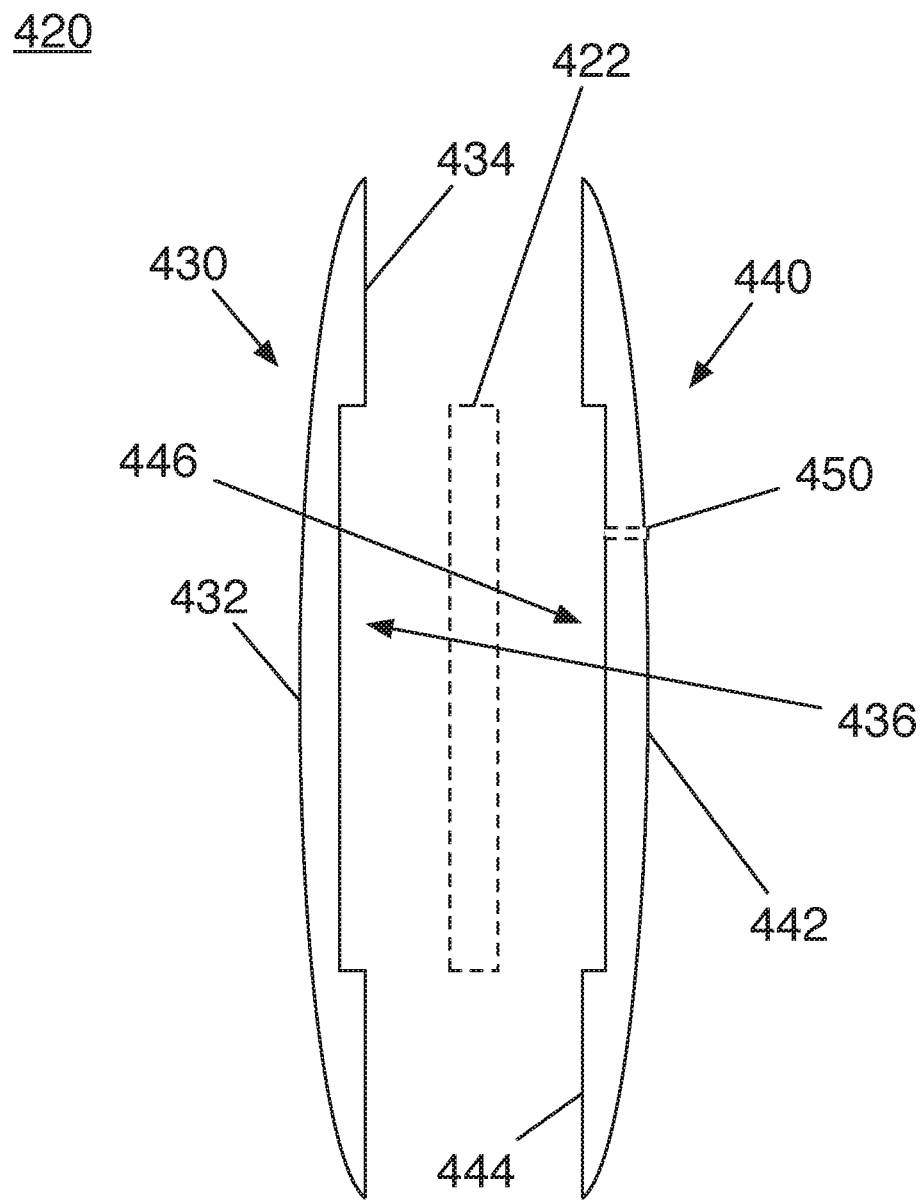
FIG. 4 illustrates a first example lens blank.
Figure 5:
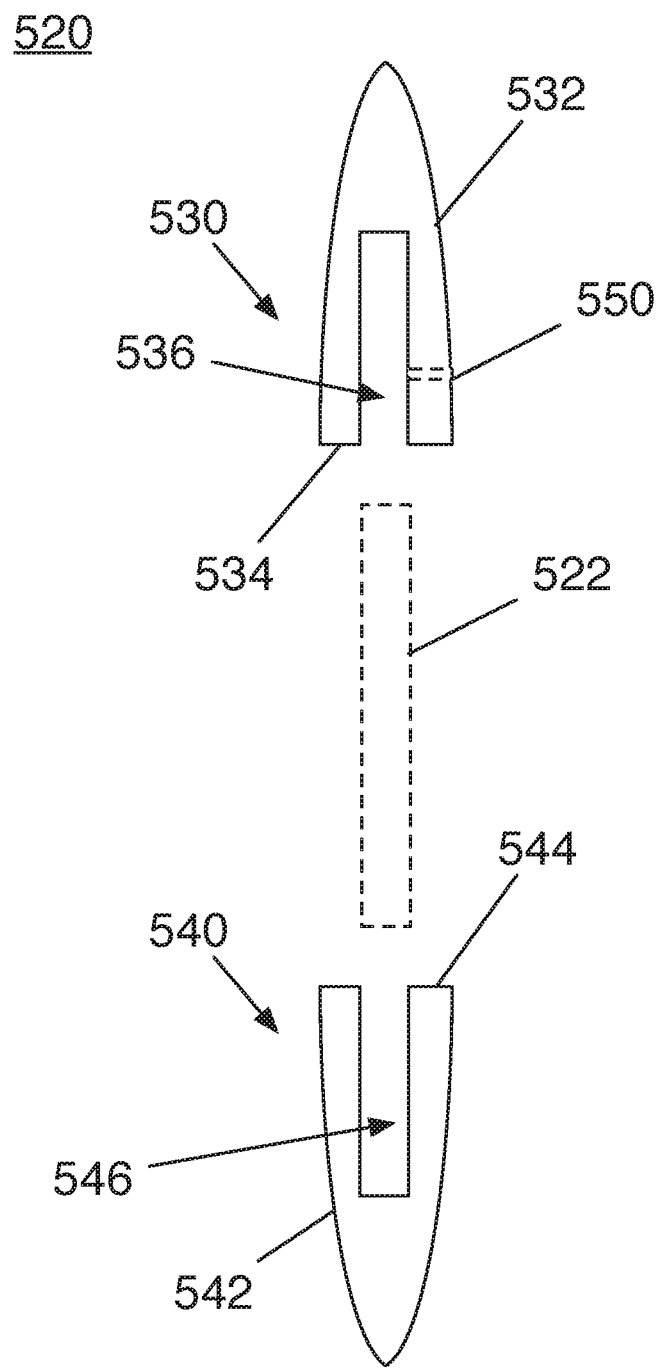
FIG. 5 illustrates a second example lens blank.
Figure 6:
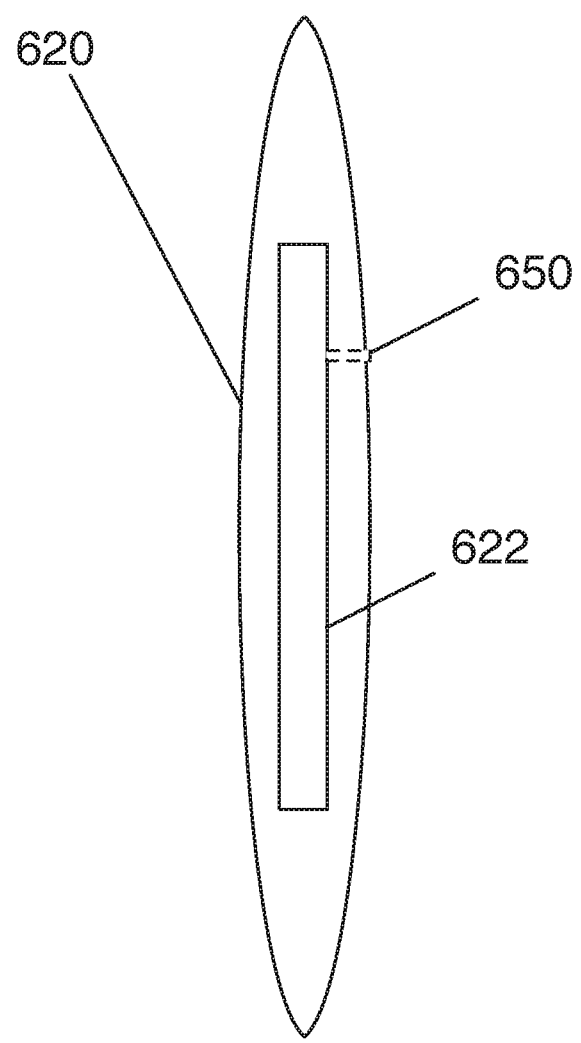
FIG. 6 illustrates a third example lens blank.

FIGS. 4-6 illustrate cut-away side views of lens blanks that can be manufactured and/or provided herein to form the lens 300. In particular, FIG. 4 illustrates a lens blank 420 comprised of vertically oriented lens blank portions, FIG. 5 illustrates a lens blank 520 comprised of horizontally oriented lens blank portions, while FIG. 6 illustrates a solitary lens blank 620.

Turning more particularly to FIG. 4, the lens blank 420 comprises partial lens blanks 430 and 440. The partial lens blanks 430 and 440 can be joined (e.g., mechanically coupled, or the like) to form the lens blank 420. In general, each of the partial lens blanks comprise an exposed surface and an internal surface. Furthermore, each of the partial lens blanks comprise a convex region oriented such that the convex region forms a cavity 422 when the partial lens blanks are joined.

In particular, the partial lens blanks 430 and 440 comprise external surfaces 432 and 442, respectively. Additionally, the partial lens blanks 430 and 440 comprise internal surfaces 434 and 444, respectively. The internal surfaces 434 and 444 comprise convex regions 436 and 446, respectively. As depicted, the convex regions 436 and 446 are arranged such that when the partial lens blanks 430 and 440 the convex regions combine to form a cavity 422.

The cavity 422 can be filled with photosensitive material. The photosensitive material can be exposed to form the HOE 310. This is described in greater detail below (e.g., refer to FIGS. 8A-8E and 9A-9E). In some examples, the photosensitive material can be polymer material sensitive to light such that when exposed the polymer crystallizes to form an optical element (e.g., Bragg grating, optical combiner, or the like) to operate as the HOE. For example, the polymer can be MEK-coflouropolymer-monomer.

In some examples, at least one of the partial lens blanks can include a port 450 to fill the cavity 422 with the photosensitive material. In some examples, the convex regions 436 and 446 can be filled with the photosensitive material prior to being joined, such that once the partial lens blanks are joined, the cavity 422 is filled with the photosensitive material. In some examples, the partial lens blanks 430 and 440 can be joined with an adhesive, via heat, via chemical reaction, via ultrasonic welding, or the like.

FIGS. 4-6 illustrate cut-away side views of lens blanks that can be manufactured and/or provided herein to form the lens 300. In particular, FIG. 4 illustrates a lens blank 420 comprised of vertically oriented lens blank portions, FIG. 5 illustrates a lens blank 520 comprised of horizontally oriented lens blank portions, while FIG. 6 illustrates a solitary lens blank 620.

Turning more particularly to FIG. 4, the lens blank 420 comprises partial lens blanks 430 and 440. The partial lens blanks 430 and 440 can be joined (e.g., mechanically coupled, or the like) to form the lens blank 420. In general, each of the partial lens blanks comprise an exposed surface and an internal surface. Furthermore, each of the partial lens blanks comprise a convex region oriented such that the convex region forms a cavity (e.g., refer to FIG. 8B) when the partial lens blanks are joined. In some examples, the partial lens blanks 430 and 440 can comprise a polymer, such as, for example, polyurethane, Trivex, or CR39.

In particular, the partial lens blanks 430 and 440 comprise external surfaces 432 and 442, respectively. Additionally, the partial lens blanks 430 and 440 comprise internal surfaces 434 and 444, respectively. The internal surfaces 434 and 444 comprise convex regions 436 and 446, respectively. As depicted, the convex regions 436 and 446 are arranged such that when the partial lens blanks 430 and 440 the convex regions combine to form a cavity 422.

The cavity 422 can be filled with photosensitive material. The photosensitive material can be exposed to form the HOE 310. This is described in greater detail below (e.g., refer to FIGS. 8A-8E). In some examples, the photosensitive material can be polymer material sensitive to light such that when exposed the polymer crystallizes to form an optical element (e.g., Bragg grating, optical combiner, or the like) to operate as the HOE. For example, the polymer can be MEK-coflouropolymer-monomer.

In some examples, at least one of the partial lens blanks can include a port 450 to fill the cavity 422 with the photosensitive material. In some examples, the convex regions 436 and 446 can be filled with the photosensitive material prior to being joined, such that once the partial lens blanks are joined, the cavity 422 is filled with the photosensitive material. In some examples, the partial lens blanks 430 and 440 can be joined with an adhesive, via heat, via chemical reaction, via ultrasonic welding, or the like.

Turning more particularly to FIG. 5, the lens blank 520 comprises partial lens blanks 530 and 540. It is noted, the partial lens blanks 530 and 540 are similar to the partial lens blanks depicted in FIG. 4, however, the partial lens blanks 530 and 540 are arranged vertically from each other while the partial lens blanks 430 and 440 are arranged horizontally from each other.

The partial lens blanks 530 and 540 can be joined (e.g., mechanically coupled, or the like) to form the lens blank 520. In general, each of the partial lens blanks comprise an exposed surface and an internal surface. Furthermore, each of the partial lens blanks comprise a convex region oriented such that the convex region forms a cavity 522 when the partial lens blanks are joined. In some examples, the partial lens blanks 530 and 540 can comprise a polymer, such as, for example, polyurethane, Trivex, or CR39.

In particular, the partial lens blanks 530 and 540 comprise external surfaces 532 and 542, respectively. Additionally, the partial lens blanks 530 and 540 comprise internal surfaces 534 and 544, respectively. The internal surfaces 534 and 544 comprise convex regions 536 and 546, respectively. As depicted, the convex regions 536 and 546 are arranged such that when the partial lens blanks 530 and 540 the convex regions combine to form a cavity 522.

The cavity 522 can be filled with photosensitive material. The photosensitive material can be exposed to form the HOE 310. This is described in greater detail below (e.g., refer to FIGS. 8A-8E and 9A-9E). In some examples, the photosensitive material can be polymer material sensitive to light such that when exposed the polymer crystallizes to form an optical element (e.g., Bragg grating, optical combiner, or the like) to operate as the HOE. For example, the polymer can be MEK-coflouropolymer-monomer.

In some examples, at least one of the partial lens blanks can include a port 550 to fill the cavity 522 with the photosensitive material. In some examples, the convex regions 536 and 546 can be filled with the photosensitive material prior to being joined, such that once the partial lens blanks are joined, the cavity 522 is filled with the photosensitive material. In some examples, the partial lens blanks 530 and 540 can be joined with an adhesive, via heat, via chemical reaction, via ultrasonic welding, or the like.

Turning more particularly to FIG. 6, the lens blank 620 is depicted. The lens blank 620 comprises cavity 622. In general, the lens blank 620 can be provided by forming the lens blank around a removable material having a shape of the cavity 622. Subsequently, the removable material can be removed to leave the cavity 622. For example, the lens blank 620 can be formed around a wax based material having a lower melting point than the lens blank 620. The port 650 can be formed in the lens and the wax based material heated to a liquid form and removed from the cavity 622. In some examples, the lens blank 620 can comprise a polymer, such as, for example, polyurethane, Trivex, or CR39.

The cavity 622 can then be filled, via port 650, with photosensitive material. The photosensitive material can be exposed to form the HOE 310. This is described in greater detail below (e.g., refer to FIGS. 8A-8E and 9A-9E). In some examples, the photosensitive material can be polymer material sensitive to light such that when exposed the polymer crystallizes to form an optical element (e.g., Bragg grating, optical combiner, or the like) to operate as the HOE. For example, the polymer can be coflouropolymer-monomer.

Figure 7:
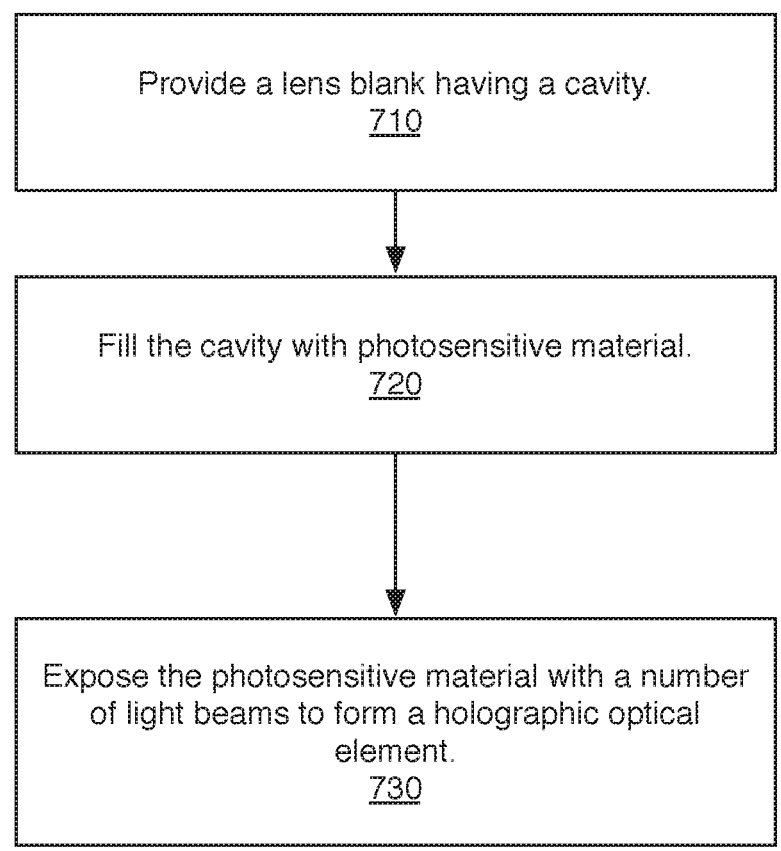
FIG. 7 illustrate an example logic flow.

FIG. 7 depicts a logic flow 700 for manufacturing a lens according to at least one example of the present disclosure. In some examples, the logic flow 700 can be implemented to manufacture the lens 300, for example, based on partial lens blanks 420, 520, or 620. The logic flow 700 is described with reference to the lens blank 620 for purposes of illustration only and not to be limiting. It is to be appreciated, however, that the logic flow 700 could be implemented to form a lens based on partial lens blanks 430 and 440 or 530 and 540. Examples are not limited in this context. The logic flow 700 may begin at block 710. At block 710 "provide a lens blank having a cavity" a lens blank having a cavity is provided. For example, the lens blank 620 having cavity 622 can be provided. In some examples, the lens blank can be formed from partial lens blanks (e.g., 430 and 440, 530 and 540, or the like). In some examples, the lens blank can be formed from a polymer material cast, injected, or otherwise filled into a mold around a removable material (e.g., wax, or the like) having a shape of the cavity. For example, the lens blank 620 can be formed from a polymer material filled in a mold around a wax portion shaped like the cavity 622. Subsequently, the wax heated and removed (e.g., via port 650, or the like).

Continuing to block 720 "fill the cavity with a photosensitive material" the cavity can be filled with a photosensitive material. For example, the cavity 622 can be filled with a photosensitive material (e.g., material 313 depicted in FIGS. 8C and 9B, or the like). In some examples, the photosensitive material can be a polymer material that when exposed to specific light beams, operates to form an HOE. For example, the photosensitive material can be coflouropolymer-monomer.

Continuing to block 730 "expose the photosensitive material with a number of light beams to form a holographic optical element" the photosensitive material can be exposed to light beam(s) to form an HOE from the photosensitive material. Accordingly, an HOE embedded within the lens blank can be formed. For example, the photosensitive material 313 can be exposed to light beams (e.g., light beams 801 and 901 depicted in FIGS. 8D and 9C, or the like) to form the HOE 310. In some examples, the photosensitive material can be exposed via interfering multiple light beams with each other.

FIGS. 8A-8E and 9A-9D depict examples to embed an HOE within a lens, according to embodiments of the present disclosure. In particular, FIGS. 8A-8E depict a technique 800 to embed an HOE within a lens, for example, using lens blank 620 while FIGS. 9A-9D depict a technique 900 to embed an HOE within a lens, for example, using partial lens blanks 430 and 440. It is noted, the techniques 800 and 900 are described with reference to lens blanks 620 and partial lens blanks 430 and 440, respectively, for purposes of clarity of presentation and not to be limiting.

Figure 8A:
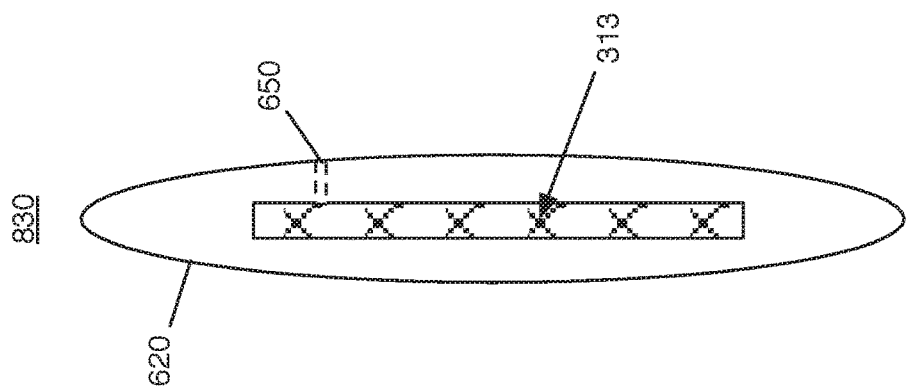
Figure 8B:
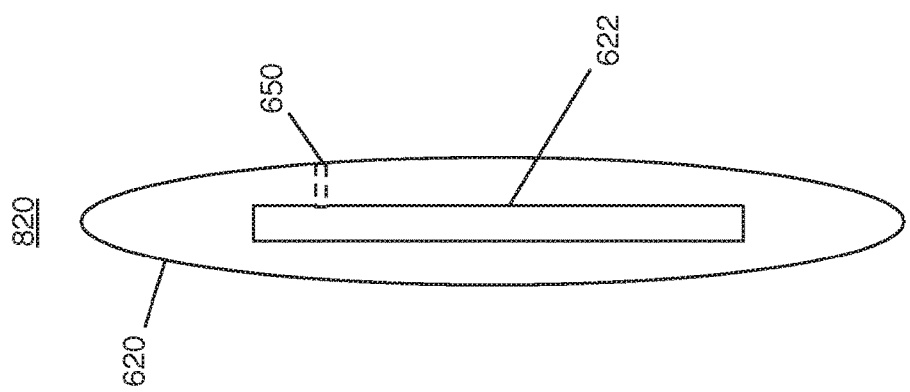

Turning more particularly to FIGS. 8A-8E, the technique 800 can begin at block 810. Turning to FIG. 8A and block 810, the lens blank 620 can be provided. As depicted, the lens blank 620 comprises a removable material 670 embedded within the lens blank 620. Furthermore, the lens blank 620 is depicted including the port 650. Turning to FIG. 8B and continuing to block 820, the removable material 670 can be removed from the lens blank 620, leaving cavity 622 in lens blank 620. For example, the removable material may be heated to a liquid form and drained from lens blank 620 via port 650. In some examples, removable material 670 may be removed via another techniques (e.g., combustion, dissolving, chemical removal, or the like).

Figure 8C:
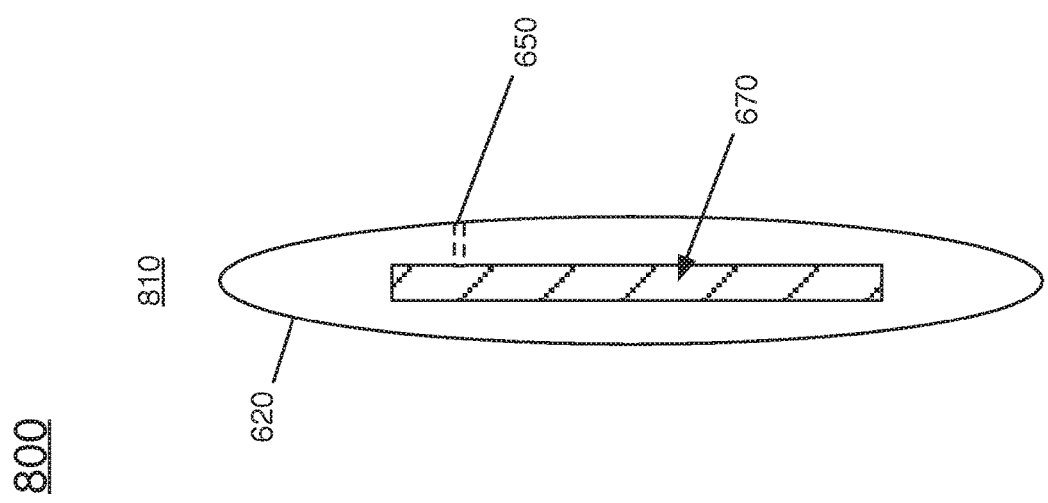

Turning to FIG. 8C and continuing to block 830, the cavity 622 can be filled with photosensitive material 313. For example, photosensitive material 313 can be added to cavity 622 via port 650, or the like. Turning to FIG. 8D and continuing to block 840, the photosensitive material 313 can be exposed to light beams 801. In particular, light beams 801 can be emitted at photosensitive material 313 to form the HOE 310. It is to be appreciated, that a number of techniques and methods for forming HOEs from photosensitive material can be implemented at block 840. However, some techniques interfere a reference and object beam to form micro-structures within the photosensitive material 313, thereby forming the HOE 310.

Turning to FIG. 8E and block 850, the lens blank 620 can be shaped into a final shape corresponding to lens 600. As such, a lens having an embedded HOE 310 is provided. In particular, the lens 600 with the HOE embedded within the lens as depicted is provided.

Turning more particularly to FIGS. 9A-9D, the technique 900 can begin at block 910. Turning to FIG. 9A and block 910, the partial lens blanks 430 and 440 can be provided. As depicted, partial the lens blanks 430 and 440 comprise recessed portions 436 and 446, respectively. Recessed portions 436 and 446 are aligned to form a cavity (e.g., refer to cavity 422 depicted in FIG. 4, or the like). Turning to FIG. 9B and continuing to block 920, the partial lens blanks can be coupled (e.g., via epoxy, adhesive, mechanical joining, chemical joining, or the like) to form lens blank 420. Furthermore, photosensitive material 313 can be added to the cavity at block 920. More specifically, photosensitive material 313 can be sandwiched between partial lens blanks 430 and 440. An amount of photosensitive material 313 can be filled in the cavity (e.g., recesses 436 and 446, or the like).

Turning to FIG. 9C and continuing to block 930, the photosensitive material 313 can be exposed to light beams 901. In particular, light beams 901 can be emitted at photosensitive material 313 to form the HOE 310. It is to be appreciated, that a number of techniques and methods for forming HOEs from photosensitive material can be implemented at block 903. However, some techniques interfere a reference and object beam to form micro-structures within the photosensitive material 313, thereby forming the HOE 310.

Turning to FIG. 9D and block 940, the coupled partial lens blanks 430 and 440 can be shaped into a final shape corresponding to lens 400. As such, a lens having an embedded HOE 310 is provided. In particular, the lens 400 with the HOE embedded within the lens as depicted is provided.

Figure 10:
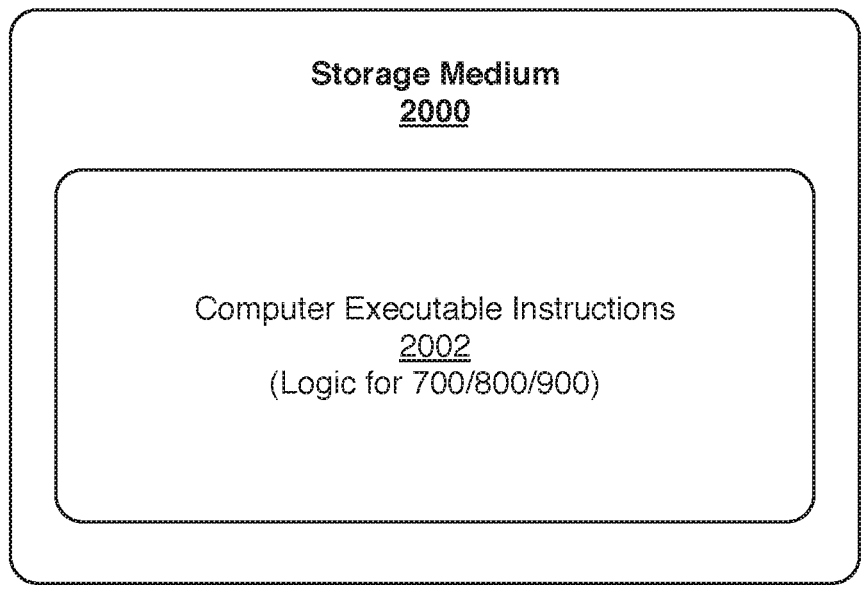
FIG. 10 illustrates an example computer readable medium.

FIG. 10 illustrates an embodiment of a storage medium 2000. The storage medium 2000 may comprise an article of manufacture. In some examples, the storage medium 2000 may include any non-transitory computer readable medium or machine readable medium, such as an optical, magnetic or semiconductor storage. The storage medium 2000 may store various types of computer executable instructions e.g., 2002). For example, the storage medium 2000 may store various types of computer executable instructions to implement technique 600. For example, the storage medium 2000 may store various types of computer executable instructions to implement logic flow 700. For example, the storage medium 2000 may store various types of computer executable instructions to implement technique 800. For example, the storage medium 2000 may store various types of computer executable instructions to implement technique 900.

Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 11:
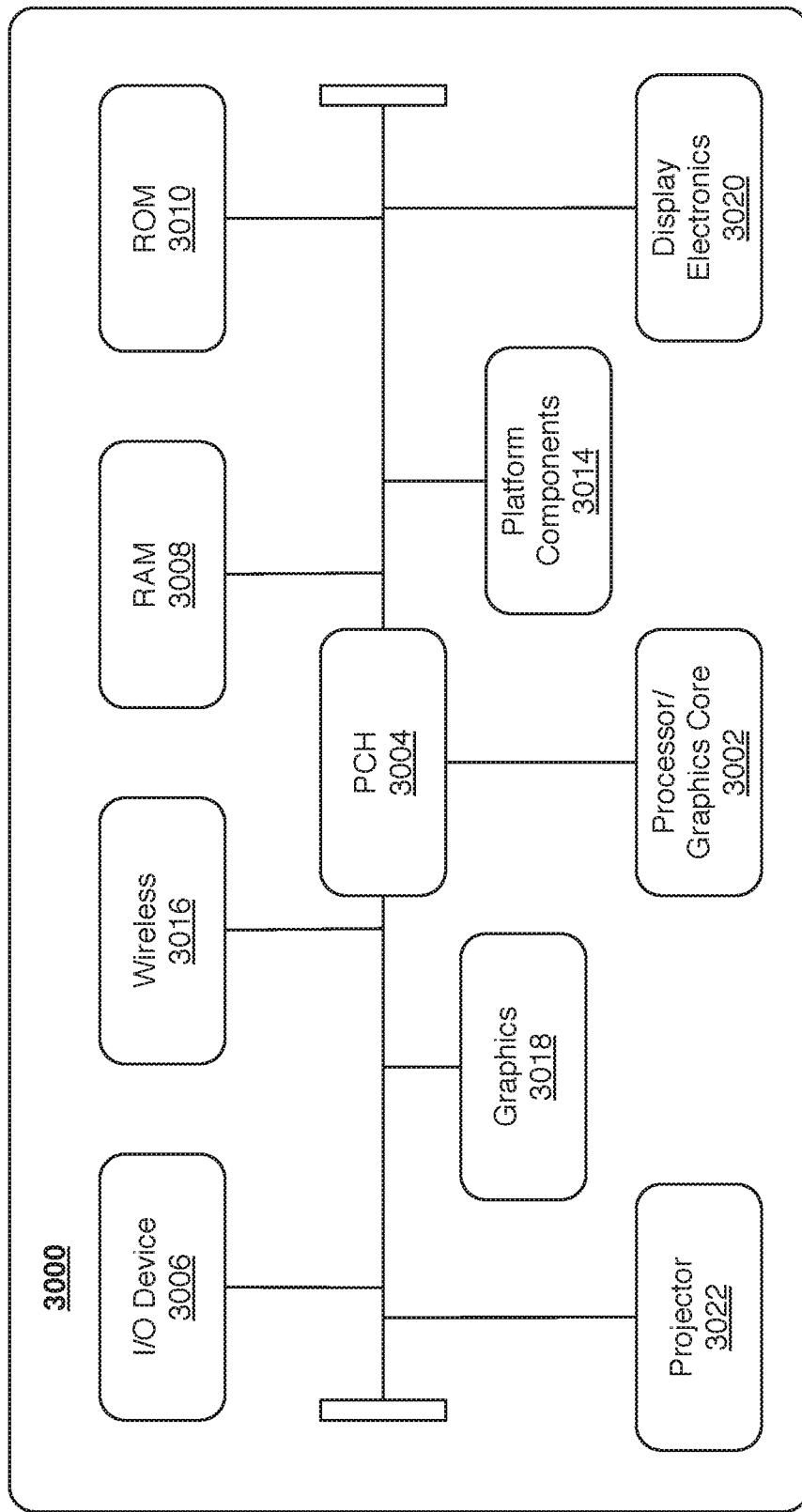
FIG. 11 illustrates a third example system.

FIG. 11 is a diagram of an exemplary system embodiment and in particular, depicts a platform 3000, which may include various elements. For instance, this figure depicts that platform (system) 3000 may include a processor/graphics core 3002, a chipset/platform control hub (PCH) 3004, an input/output (I/O) device 3006, a random access memory (RAM) (such as dynamic RAM (DRAM)) 3008, and a read only memory (ROM) 3010, display electronics 3020 (e.g., lens 300, lens 400, lens 600, or the like), projector 3022 (e.g., projector 110, or the like), and various other platform components 3014 (e.g., a fan, a cross flow blower, a heat sink, DTM system, cooling system, housing, vents, and so forth). System 3000 may also include wireless communications chip 3016 and graphics device 3018. The embodiments, however, are not limited to these elements.

As depicted, I/O device 3006, RAM 3008, and ROM 3010 are coupled to processor 3002 by way of chipset 3004. Chipset 3004 may be coupled to processor 3002 by a bus 3012. Accordingly, bus 3012 may include multiple lines.

Processor 3002 may be a central processing unit comprising one or more processor cores and may include any number of processors having any number of processor cores. The processor 3002 may include any type of processing unit, such as, for example, CPU, multi-processing unit, a reduced instruction set computer (RISC), a processor that have a pipeline, a complex instruction set computer (CISC), digital signal processor (DSP), and so forth. In some embodiments, processor 3002 may be multiple separate processors located on separate integrated circuit chips. In some embodiments processor 3002 may be a processor having integrated graphics, while in other embodiments processor 3002 may be a graphics core or cores.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

The disclosure now turns to providing example implementations.

Example 1

A method to manufacture a wearable display lens, comprising: filling a cavity in a lens blank with a photosensitive material; and exposing the first material with at least one light beam to form a holographic optical element (HOE) in the photosensitive material.

Example 2

The method of example 1, comprising, shaping the lens blank to an eyewear lens shape.

Example 3

The method of example 1, comprising: injecting, via a port in the outside surface of the lens blank, the polymer material into the cavity to fill the cavity; and sealing the port.

Example 4

The method of example 1, wherein the photosensitive material comprises polymer.

Example 5

The method of example 4, wherein the photosensitive material comprises MEK-coflouropolymer-monomer.

Example 6

The method of example 1, comprising: providing the partial lens blank; and emptying the cavity in the partial lens blank.

Example 7

The method of example 6, emptying the cavity in the partial lens blank comprising removing a filler material from the cavity, the filler material to form the cavity during forming of the partial lens blank.

Example 8

The method of example 1, comprising: providing a first partial lens blank; providing a second partial lens blank, each of the first and second partial lens blank comprising a recess; coupling the first partial lens blank and the second partial lens blank to form the lens blank, the recesses aligned to form the cavity.

Example 9

The method of example 8, comprising drilling a hold in the first partial lens blank to access the cavity.

Example 10

The method of example 8, filling the cavity in the lens blank comprising sandwiching the photosensitive material between the first partial lens blank and the second partial lens blank.

Example 11

The method of example 1, comprising: projecting at least one light beam to interfering a reference beam and one or more object beams at the projection surface to form a holographic optical element (HOE), the HOE to reflect incident light to a first exit pupil; and moving at least one of the reference beam, the one or more object beams, or the projection surface to change the HOE to reflect incident light to a second exit pupil different than the first exit pupil.

Example 12

A lens manufactured according to the method of any one of examples 1 to 11.

Example 13

A projection system lens, comprising: a lens blank; and a holographic optical element (HOE) embedded within the lens blank.

Example 14

The projection system lens of example 13, the lens blank having a first area and the HOE having a second area less than the first area.

Example 15

The projection system lens of example 14, the first area corresponding to a viewable area of the lens.

Example 16

The projection system lens of example 14, wherein the second area is between 4 and 12 times smaller than the first area.

Example 17

The projection system lens of example 13, wherein the lens blank comprises polymer.

Example 18

The projection system lens of example 13, wherein the HOE comprises a photosensitive material different than a material of the lens blank.

Example 19

The projection system lens of any one of examples 13 to 18, wherein the projection surface is a glasses lens, a goggle lens, or a helmet visor.

Example 20

A system for projecting an image, the system comprising: a frame; a lens coupled to the frame, the lens comprising a holographic optical element (HOE) embedded within the lens; and a projector coupled to the frame, the projector to project light onto the HOE.

Example 21

The system of example 20, the lens comprising: a lens blank having a cavity, wherein the HOE comprises a photosensitive material filled into the cavity and exposed to at least one light beam.

Example 22

The system of example 21, wherein the photosensitive material is injected into the cavity or cast into the cavity.

Example 23

The system of example 21, wherein the lens blank comprising a first partial lens blank and a second partial lens blank, each of the first partial lens blank and the second partial lens blank comprises a recess aligned to form the cavity.

Example 24

The system of example 20, the lens blank having a first area and the HOE having a second area less than the first area.

Example 25

The system of example 24, the first area corresponding to a viewable area of the lens.

Example 26

The system of example 24, wherein the second area is between 4 and 12 times smaller than the first area.

Example 27

The system of example 20, wherein the lens comprise polymer.

Example 28

The system of example 20, the HOE to reflect light incident on the HOE from a first angle and direction to project an image to an exit pupil.

Example 29

The system of any one of examples 20 to 28, wherein the lens is a glasses lens, a goggle lens, or a helmet visor.

Example 30

The system of example 29, wherein the frame is glasses, goggles, or a helmet.

Example 31

The system of any one of examples 20 to 28, comprising a battery electrically coupled to the projector.

Example 32

The system of any one of examples 20 to 28, comprising a graphic processor to receive an image information element to include an indication of an image and the send a display control signal to the projector to cause the projector to project one or more pixels corresponding to the image onto the HOE.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

What is claimed is:

1. A method to manufacture a wearable display lens, comprising:
   filling, via a port in the outside surface of a lens blank, a cavity in the lens blank with a photosensitive polymer material, wherein the photosensitive material comprises MEK-cofluoropolymer-monomer;
   exposing the photosensitive material with at least one light beam to form a holographic optical element (HOE) in the photosensitive material, the at least one light beam including a reference beam and a plurality of object beams;
   interfering the reference beam with the plurality of object beams at a projection surface of the lens blank to form the HOE, the HOE to reflect incident light from an input pupil to a first exit pupil; and
   moving the plurality of object beams to change the HOE to also reflect incident light from the input pupil to a second exit pupil different than the first exit pupil.

2. The method of claim 1, comprising, shaping the lens blank to an eyewear lens shape.

3. The method of claim 1, comprising:
   sealing the port.

4. The method of claim 1, comprising:
   providing a partial lens blank having a cavity; and
   emptying the cavity in the partial lens blank.

5. The method of claim 4, emptying the cavity in the partial lens blank comprising removing a filler material from the cavity, the filler material to form the cavity during forming of the partial lens blank.

6. The method of claim 1, comprising:
   providing a first partial lens blank;
   providing a second partial lens blank, each of the first and second partial lens blank comprising a recess;
   coupling the first partial lens blank and the second partial lens blank to form the lens blank, the recesses aligned to form the cavity.

7. The method of claim 6, comprising drilling a hole in the first partial lens blank to access the cavity.

8. The method of claim 6, filling the cavity in the lens blank comprising sandwiching the photosensitive material between the first partial lens blank and the second partial lens blank.

* * * * *